United States Patent [19]

Tachiuchi et al.

[11] Patent Number: 4,473,879
[45] Date of Patent: Sep. 25, 1984

[54] DATA TRANSFER SYSTEM IN WHICH TIME FOR TRANSFER OF DATA TO A MEMORY IS MATCHED TO TIME REQUIRED TO STORE DATA IN MEMORY

[75] Inventors: Tsuguji Tachiuchi, Odawara; Shigeru Hirahata, Yokohama, both of Japan

[73] Assignee: Hitachi, Ltd., Tokyo, Japan

[21] Appl. No.: 339,654

[22] Filed: Jan. 15, 1982

[30] Foreign Application Priority Data

Jan. 16, 1981 [JP] Japan ................................ 56-3814

[51] Int. Cl.³ .............................................. G06F 3/00
[52] U.S. Cl. ................................................. 364/200
[58] Field of Search ............... 364/200, 900, 466, 567; 340/825.05, 825.2; 371/49

[56] References Cited

U.S. PATENT DOCUMENTS

| | | | |
|---|---|---|---|
| 3,753,234 | 8/1973 | Gilbert et al. | 364/200 |
| 3,830,962 | 8/1974 | Mailloux | 364/900 |
| 3,896,418 | 7/1975 | Brown | 364/200 |
| 3,970,997 | 7/1976 | Daly et al. | 364/200 |
| 3,975,712 | 8/1976 | Hepworth et al. | 371/49 |
| 4,031,512 | 6/1977 | Faber | 340/825.05 |
| 4,064,486 | 12/1977 | Faber | 340/825.05 |
| 4,071,887 | 1/1978 | Daly et al. | 364/900 |
| 4,131,946 | 12/1978 | Dlugos | 364/567 |

Primary Examiner—Joseph F. Ruggiero
Assistant Examiner—Jameson Lee
Attorney, Agent, or Firm—Antonelli, Terry & Wands

[57] ABSTRACT

A data transfer system comprises data retaining means for retaining n-bit digital data (n being an integer), serial/parallel data converting means for converting the n-bit digital data transferred from the data retaining means from parallel data to serial data or vice versa in synchronism with first clock signals generated at a first clock frequency, counting means for counting second clock signals generated at a second clock frequency, and control means for transferring the n-bit digital data from the data retaining means to the serial/parallel data converting means each time the counting means counts a predetermined number of clock signals.

6 Claims, 3 Drawing Figures

DATA TRANSFER SYSTEM IN WHICH TIME FOR TRANSFER OF DATA TO A MEMORY IS MATCHED TO TIME REQUIRED TO STORE DATA IN MEMORY

BACKGROUND OF THE INVENTION

The present invention relates to a data transfer system in a data processing system having a central processing unit (CPU).

The data transfer system includes a serial transfer system in which n-bit data (n being an integer) is transferred bit by bit sequentially from a low or high order bit, and a parallel transfer system in which n-bit data is simultaneously transferred in parallel. A floppy disk unit has been widely used as an external storage for a computer or the like. It employs the serial transfer system in which eight-bit data is serially transferred bit by bit. On the other hand, since the eight-bit data is processed in parallel in a data processing unit, a floppy disk controller includes a register connected to a data bus, and a shift register for parallel-to-serial conversion of the data placed between the register and the floppy disk unit.

A write operation of involving the writing eight-bit data into the floppy disk unit is now explained. The CPU reads in the eight-bit data from a RAM in accordance with a procedure stored in a ROM and sends out the data to the register. The data loaded in the register is transferred to the shift register in parallel, and the shift register transfers the data, bit by bit, at a constant interval in synchronism with a clock signal, to the floppy disk unit. After the register has transferred the data to the shift register, it sends a transfer request signal (flag bit) to the CPU requesting the next data transfer. In response to the request signal, the CPU reads out the data to be next transferred, from the RAM and transfers it to the register. When the data is loaded into the register, it extinguishes the transfer request signal and keeps the transfer request signal extinguished until that data has been transferred out. In this manner, the CPU responds to the transfer request signal to periodically load the data into the register. One CPU write operation needs a total of approximately 20 machine cycles (system clocks) including a step for checking the presence or absence of the transfer request signal, a step for reading the data to be loaded into the register into the CPU from the RAM and a step for loading the read data into the register. If a general purpose CPU operating at 1 MHz is used, approximately 20 microseconds are needed to complete each write operation. On the other hand, since the transfer rate of the floppy disk unit is usually 500K bits/sec (2 microseconds per bit), sixteen microseconds are needed to transfer the eight-bit data. Since the general purpose CPU cannot process twenty machine cyles in sixteen microseconds, a special and expensive high speed CPU must be used when the floppy disk unit is used. In order to avoid the above problem, a DMA system has been proposed in which the data is transferred not through the CPU but directly between the RAM and the floppy disk unit. In the DMA system, however, not only a DMA control IC, but also a bidirectional address bus buffer and data bus buffer and a control circuit for controlling the direction of the buffers are required. As a result, the circuit is of large scale and hence the DMA data transfer system is complex and expensive.

SUMMARY OF THE INVENTION

It is an object of the present invention to provide a data transfer system having an increased data transfer rate with a simple configuration without requiring a high CPU operating speed.

In accordance with the present invention, multi-bit data is periodically transferred between a data processing unit and an external unit, such as a floppy disk unit, through a register so that the data is transferred between the data processing unit and the shift register without requiring the check of the presence or absence of a transfer request signal. As a result, the period required for the data transfer between the data processing unit and the shift register is shortened. This period is set to be equal to the period of the transfer of the multi-bit data between the shift register and the external unit. In accordance with a further aspect of the present invention, in order to attain precise synchronism between both the transfers of data, the clock signal for controlling operation of the shift register is derived by frequency-dividing a clock signal used in the data processing unit.

DESCRIPTION OF THE PREFERRED EMBODIMENT

Figure 1:
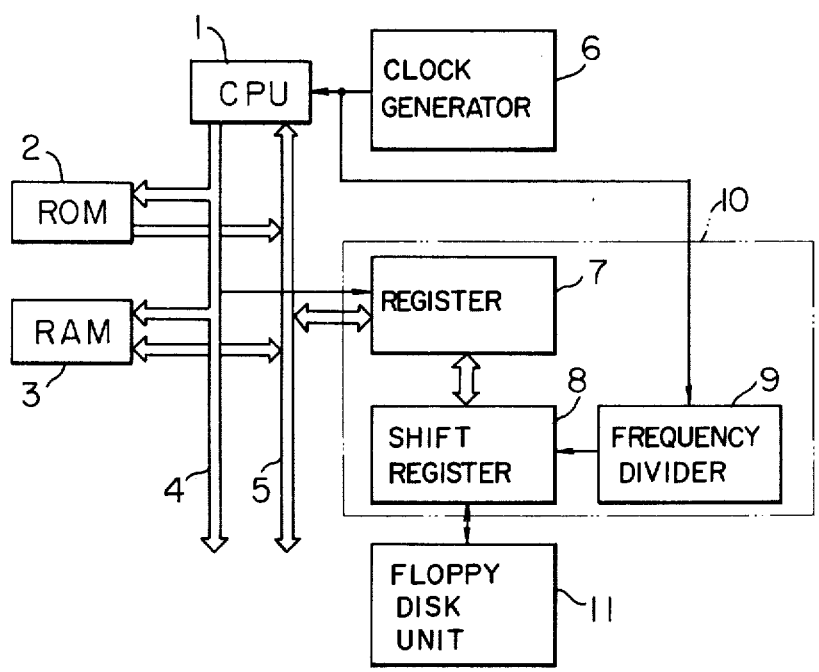
FIG. 1 shows a block diagram of one embodiment of the present invention.

Referring to FIG. 1, numeral 1 denotes a central processing unit (CPU), numeral 2 denotes a memory (ROM) which mainly stores a system operation procedure (program), numeral 3 denotes a memory (RAM) which temporarily stores data in the course of system operation, numeral 4 denotes an address bus, numeral 5 denotes a data bus, numeral 6 denotes a clock generator for generating a clock signal (1 MHz) to time the operations of the CPU, numeral 7 denotes a register for temporarily storing eight-bit data, numeral 8 denotes an eight-bit shift register, numeral 9 denotes a frequency divider for frequency-dividing the clock signal by a factor of two, and numeral 11 denotes a floppy disk unit. The register 7 transfers the eight-bit data between the data bus 5 and the shift register 8, and the eight-bit data is transferred in parallel between the register 7 and the shift register 8, while being transferred bit by bit between the shift register 8 and the floppy disk unit 11 each time the clock signal (0.5 MHz) is received from the frequency divider 9. The register 7, the shift register 8 and the frequency divider 9 form a floppy disk controller 10.

When the floppy disk unit 11 transfers data to the shift register 8 or receives data therefrom, 128-byte data is transferred as one unit (sector) at a rate of two microseconds per bit. When the CPU executes an instruction, it needs a time period determined by the type of instruction. For example, a certain instruction to read the data of the RAM 3 into the register of the CPU 1 needs five clock signals in the CPU 1, that is, a period of five microseconds, and a certain instruction for loading the data read into the CPU 1 into the register 7 needs six clock signals in the CPU 1, that is, a period of six microseconds. Since the time periods required by the respective types of instructions executed by the CPU 1 are known, the time period can be determined by designating the instruction to be executed by the CPU 1. By selecting the instructions to be executed by the CPU 1 such that the time period from a time point at which the CPU 1 loaded the eight-bit data into the register 7 to a time point at which the CPU reads out the data to be next loaded from the RAM 3 and is ready for loading that data into the register 7, or a time period from a time point at which the CPU 1 received the eight-bit data from the register 7 to a time point at which the CPU 1 writes that data into a predetermined location of the RAM 3 and is ready for receiving the next data from the register 7, is equal to a time period (sixteen microseconds) required for the eight-bit data to be transferred between the shift register 8 and the floppy disk unit 11, the data can be smoothly transferred between the RAM 3 and the floppy disk unit 11 without watching for a transfer request signal.

Figure 2:
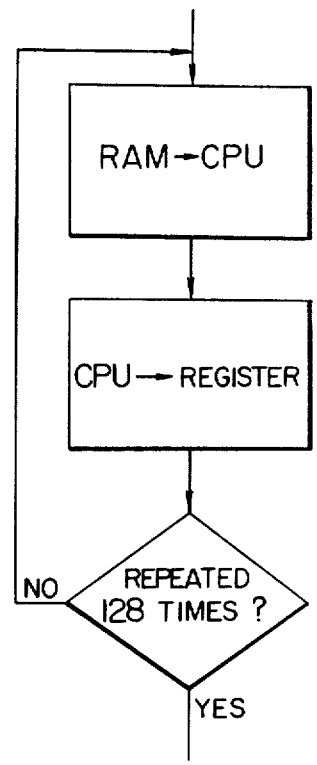
FIG. 2 shows a flow chart illustrating a CPU operation.
Figure 3:
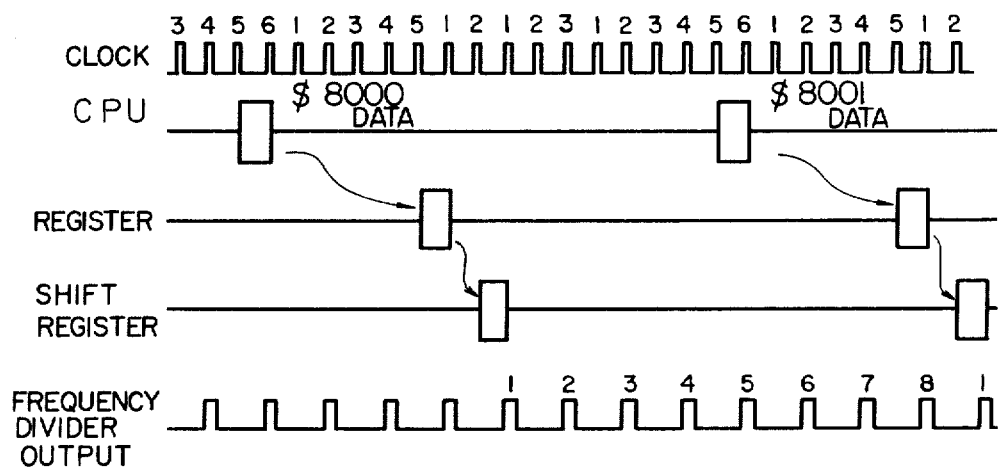
FIG. 3 shows a timing chart for the system shown in FIG. 1.

Referring now to FIGS. 2 and 3, the transfer of the data in the RAM 3 to the floppy disk unit 11 is explained. The transfer of the data from the floppy disk unit 11 to the RAM 3 is similar.

As shown in FIG. 2, a step for reading the eight-bit data from the RAM 3 to the CPU 1, a step for transferring the read data to the register 7 and a step for checking if the above steps have been repeated 128 times (because the floppy disk unit 11 is driven by 128-byte sector) are required. The program instruction is selected such that those three steps are carried out in sixteen microseconds. One example thereof is shown below by a mnemonic code for Motorola CPU MC 6809.

|    | LDX  | #$ 8000 |                                         |
|----|------|---------|-----------------------------------------|
|    | LDB  | #128    |                                         |
| L1 | LDA  | ,x+     | 6 machine cycles (LOAD DATA FROM RAM3→CPU1) |
|    | STA  | DATAREG | 5 machine cycles (LOAD DATA FROM CPU1→REG7) |
|    | DECB |         | 2 machine cycles                        |
|    | BNE  | L1      | 3 machine cycles                        |

As shown in FIG. 3, the data in the RAM 3 is loaded into a register in the CPU 1 at the trailing edge of a fifth clock signal of the six clock signals required to read the data into the CPU 1, and the data read in the CPU 1 is transferred to the register 7 at the fall of a fifth clock signal of the five clock signals required to transfer the data from the CPU 1 to the register 7. This operation is repeated once in every sixteen microseconds. On the other hand, the eight-bit data in the shift register 8 is transferred to the floppy disk unit 11 by the 0.5 MHz clock signal. Accordingly, the shift register 8 is emptied in every sixteen microseconds so that the data is smoothly transferred from the register 7 to the shift register 8 without transfer error.

Since there are various types of instructions which instruct the CPU to exchange the data with the memory, it is desirable to appropriately combine the instructions such that the CPU operation period in the data transfer is equal to the transfer period of the floppy disk unit. If it is not possible to combine the instructions such that the operation period of the CPU and the transfer period of the floppy disk unit are equal, the CPU operation period is set shorter and an instruction which executes essentially no operation (NOP) is added so that the CPU operation period is set to be equal to the transfer period of the floppy disk unit. By setting the operation period of the CPU in the data transfer operation to be equal to the transfer period of the floppy disk unit, the step of checking for the presence or absence of the transfer request signal can be omitted and hence the data can be transferred with a low speed CPU. Since the clock signal for the shift register 8 is derived by frequency-dividing the clock signal of the CPU 1, the operations timed by the clock signals can be exactly synchronized and no problem due to the omit of the check step is encountered.

The clock signal frequency $f_1$ of the CPU 1 and the clock signal frequency $f_2$ of the shift register 8 may be selected such that a relation of $f_1 = f_2 \times N/n$ is met, where N is the number of clocks required for a series of operations repeated by the CPU 1 to transfer the data and n is the number of bits of the shift register 8. For one sector of data transfer, an error within one byte is permitted.

We claim:

1. A data transfer system comprising:
   (a) a first memory having a memory capacity of a plurality of n-bit data and allowing data access bit by bit;
   (b) a shift register having a storage capacity of n bits and including a first input/output section for inputting and outputting n-bit data in parallel, a pulse input terminal to which pulse signals are applied and a second input/output section connected to said first memory for transferring said n-bit data to or receiving said n-bit data from said first memory bit by bit, each bit being transferred in time with the receipt of one of said pulse signals at said pulse input terminal;
   (c) a second memory having a memory capacity of at least a plurality of n-bit data for inputting and outputting n-bit data in parallel;
   (d) clock signal generator means for generating clock signals;
   (e) transfer means connected to receive said clock signals from said clock signal generator means for transferring n-bit data in parallel between said first input/output section of said shift register and said second memory once during each successive period of N clock signals received, where N is greater than n; and
   (f) frequency dividing means connected to said clock signal generator means for frequency-dividing said clock signals by a factor of n/N and for supplying the frequency-divided pulse signals to said pulse input terminal of said shift register.

2. A data transfer system according to claim 1 wherein said transfer means includes a register having a storage capacity of at least one n-bit data and which is connected to said first input/output section of said shift register, a data bus connected between said register and said second memory for transmitting data therebetween and a central processing unit for controlling the transmission of the data transferred through said data bus in response to clock signals received from said clock signal generator means.

3. A data transfer system comprising:
   (a) clock signal generator means for generating clock signals;
   (b) a first memory having a memory capacity of a plurality of n-bit data and including means for writing data bit by bit into said first memory at a rate of n bits during each period of N clock signals generated by said clock signal generator means;

(c) a shift register having a storage capacity of n bits and including input means for inputting n-bit data into said shift register in parallel, a pulse input terminal to which pulse signals are applied and output means connected to said first memory for transferring said n-bit data to said first memory bit by bit, each bit being transferred in time with receipt of one of said pulse signals at said pulse input terminal;

(d) a second memory having a memory capacity of at least a plurality of n-bit data and including means for outputting n-bit data in parallel;

(e) transfer means connected to said second memory, said shift register and said clock signal generating means for transferring n-bit data in parallel from said second memory to said shift register once during each successive period of N clock signals received from said clock signal generator means, where N is greater than n, including data processor means programmed to effect said data transfer within said period of N clock signals; and (f) frequency dividing means connected to said clock signal generator means for frequency-dividing said clock signals by a factor of n/N and for supplying the frequency-divided pulse signals to said pulse input terminal of said shift register.

4. A data transfer system according to claim 3, wherein said transfer means includes register means having a storage capacity of at least one n-bit data and which is connected to said shift register for storing n-bit data received from said second memory and for transferring said n-bit data to said shift register, a data bus connected between said register means and said second memory for transmitting data therebetween and a central processing unit for controlling said data bus in response to clock signals received from said clock signal generator means.

5. A data transfer system comprising:

(a) clock signal generator means for generating clock signals;

(b) a first memory having a memory capacity of a plurality of n-bit data and including means for outputting data bit by bit from said first memory at a rate of n bits during each period of N clock signals generated by said clock signal generator means;

(c) a shift register having a storage capacity of n bits and including output means for outputting n-bit data from said shift register in parallel, a pulse input terminal to which pulse signals are applied and input means connected to said first memory for storing said n-bit data from said first memory into said shift register bit by bit, each bit being stored in time with receipt of one of said pulse signals at said pulse input terminal;

(d) a second memory having a memory capacity of at least a plurality of n-bit data and including means for inputting n-bit data in parallel;

(e) transfer means connected to said second memory, said shift register and said clock signal generator means for transferring n-bit data in parallel from said shift register to said second memory once during each successive period of N clock signals received from said clock signal generator means, where N is greater than n, including data processor means programmed to effect said data transfer within said period of N clock signals; and (f) frequency dividing means connected to said clock signal generator means for frequency-dividing said clock signals by a factor of n/N and for supplying the frequency-divided pulse signals to said pulse input terminal of said shift register.

6. A data transfer system according to claim 5, wherein said transfer means includes register means having a storage capacity of at least one n-bit data and which is connected to said shift register for storing n-bit data received from said shift register and for transferring said n-bit data to said second memory, a data bus connected between said register means and said second memory for transmitting data therebetween and a central processing unit for controlling said data bus in response to clock signals received from said clock signal generator means.

* * * * *